United States Patent [19]
Farber et al.

[11] 3,828,760
[45] Aug. 13, 1974

[54] OVEN

[75] Inventors: Milton H. Farber, Bronxville; Irving R. Belinkoff, Queens Village, both of N.Y.

[73] Assignee: LCA Corporation, Yonkers, N.Y.

[22] Filed: May 23, 1973

[21] Appl. No.: 363,293

[52] U.S. Cl. .............................. 126/21 A, 219/400
[51] Int. Cl. ............................................. A21b 1/00
[58] Field of Search ....... 126/21, 21 A, 19; 219/400

[56] References Cited
UNITED STATES PATENTS

| | | | |
|---|---|---|---|
| 3,514,576 | 5/1970 | Hilton et al. ........................ | 219/400 |
| 3,529,582 | 9/1970 | Hurico et al. ........................ | 126/21 |
| 3,656,469 | 4/1972 | Jung et al. ........................ | 126/21 A |

*Primary Examiner*—Edward G. Favors
*Attorney, Agent, or Firm*—Seidel, Gonda & Goldhammer

[57] ABSTRACT

A broiling, cooking, roasting, and baking oven, which may be used for defrosting as well, is disclosed wherein heated air in the upper portion of a cooking chamber moves downwardly in a cyclonic turbulent pattern, then meets at a vortex in the center bottom portion of the chamber, and then is moved upwardly while maintaining its cyclonic form. The cooking chamber is insulated from a motor chamber by means of an intermediate insulation chamber and through which air may or may not flow.

20 Claims, 6 Drawing Figures

PATENTED AUG 13 1974

OVEN

This invention relates to an oven for home and/or commercial use for broiling, cooking, roasting, defrosting and/or baking food. Air in the upper portion of a cooking chamber is directed centrifugally outwardly by a vane type impeller in the form of an air envelope over a heater means. The heated air is then directed in a cyclonic turbulent pattern downwardly into the cooking chamber. The air is then moved upwardly while maintaining its cyclonic form by means of said vane type impeller. Before the air is recycled and reheated, the air may pass through a filter.

The cyclonic turbulent air pattern is preferred over other air flow patterns such as an air curtain. An air curtain tends to create a concentrated blast of air, hot spots, as well as burning and deforming of delicate baked goods. The filter, if present, traps solid particles of food soil, grease and the like before the air contacts the heater means. As a result thereof, the heater means and the walls of the chamber remain substantially clean. The walls of the chamber may be coated with a continuous cleaning catalyst to eliminate build-up of contaminant.

An intermediate insulation chamber is disposed between the cooking chamber and the motor chamber. The intermediate insulation chamber protects the motor in the motor chamber from the heat or temperature of the cooking chamber and also prevents the cooking chamber for adverse effects of outside temperature. The motor in the motor chamber drives the impeller in the cooking chamber and also drives an auxiliary fan in the motor chamber. The auxiliary fan causes air to flow through the motor chamber, preferably through a duct concentrating the flow of air over the motor, to provide a positive cooling effect on the motor and any instruments within the motor chamber.

An embodiment of the present invention in the form of a portable type oven can utilize a small motor rated at from about 0.006 to 0.015 horsepower at 2,000 to 3,500 rpm and cause the air in the cooking chamber to have an average velocity of about 100 to 300 feet per minute. Just beyond the periphery of the impeller in the cooking chamber, the air moves centrifugally at a velocity of about 800–1,000 feet per minute. The air moving upwardly in the vortex at the entrance to the impeller suction side has a velcoity of about 300 to 500 feet per minute.

In the embodiment in which air flows in the intermediate insulation chamber, the air flows upwardly by convection in flow passages alongside the cooking chamber and exits through the insulation chamber to the atmosphere. The air flowing in the intermediate insulation chamber and said flow passages is completely independent from and separate from the air introduced into the motor chamber by way of the auxiliary fan. Likewise, each of such air movements is independent from the cyclonic air pattern in the cooking chamber. In addition to contact with the cyclonic air pattern, the food is subjected to radiant heat from the heater means.

Because of the structrual interrelationship of the components of the oven of the present invention, the heater means may have a rating as low as 1,000 watts for an oven having a cooking chamber of about 1 cubic foot.

Heretofore, bakers and broilers have been embodied in separate units, or if embodied in a single unit, it has proved necessary to manipulate some aspect of the oven to convert it from a baker to a broiler or vice versa. Thus, referring specifically to U.S. Pat. No. 3,529,582, patented Sept. 22, 1970, it is suggested that the size of the openings below the heating element may be varied to regulate whether the unit functions as a baking oven or a broiling oven. In the oven of the present invention, both baking and broiling are achieved since the holes in the grid member of the present invention, and the grid member itself, permit radiant heat to be used for broiling while the turbulent flow of the air permits baking to be achieved. Hence, no adjustment of any nature is necessary with the oven of the present invention to accomplish both types of cooking.

Braking can be achieved notwithstanding that sufficient radiant heating is imparted through the holes in the grid member below the heater means to achieve browning, without burning, of the food being cooked. We have found that about 20 to 40 percent of the grid member below the heater means should be in the form of openings, preferably about 34 percent. With this percentage of openings, sufficient radiant heat is imparted to the food to achieve browning, without burning.

It is an object of the present invention to provide a novel cooking and/or defrosting oven wherein air is circulated at high speed across heater means in a cyclonic turbulent pattern to effect cooking of food within the chamber.

It is another object of the present invention to provide a cooking and/or defrosting oven for cooking and/or defrosting food by means of radiant heat and a cyclonic turbulent air flow pattern.

It is another object of the present invention to provide a cooking and/or defrosting oven wherein upwardly moving air in a vortex pattern is filtered before being reheated and recycled at a velocity of about 800 to 1,000 feet per minute.

It is another object of the present invention to provide a cooking and/or defrosting oven wherein air is circulated at a high velocity in cyclonic turbulent air pattern and predetermined uniform temperatures can be maintained throughout the cooking chamber.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawings in detail, wherein like numerals indicate like elements, there is shown in FIG. 1 a perspective view of an oven in accordance with the present invention designated generally as 10. The oven includes a housing designated generally as 12.

Figure 1:
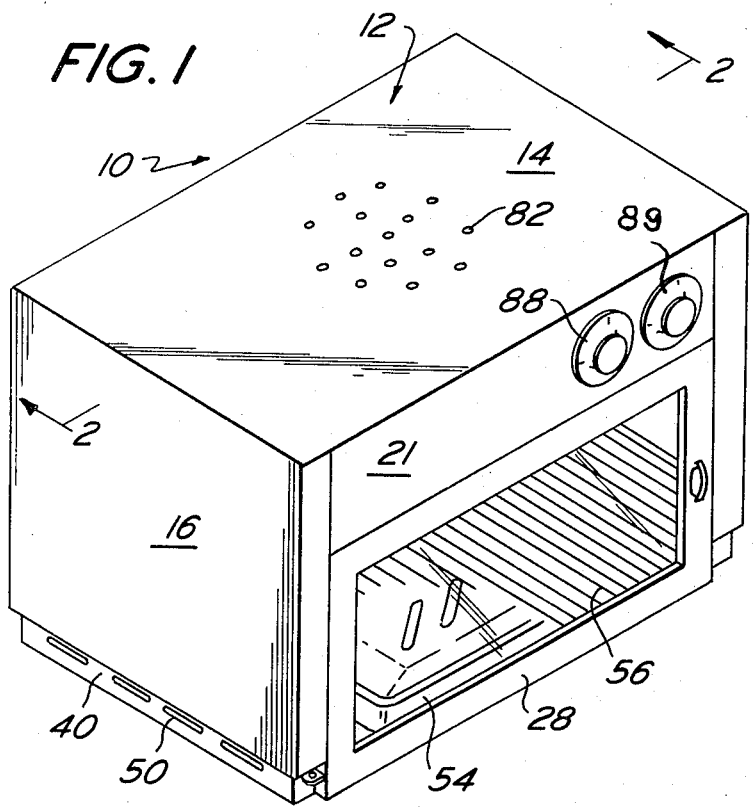
FIG. 1 is a perspective view of an oven in accordance with the present invention.

The housing 12 includes a top wall 14 connected to downwardly extending side walls 16 and 18 on opposite sides of the housing. The housing 12 includes a bottom wall 20, a rear wall 19, and a front wall 21.

Figure 4:
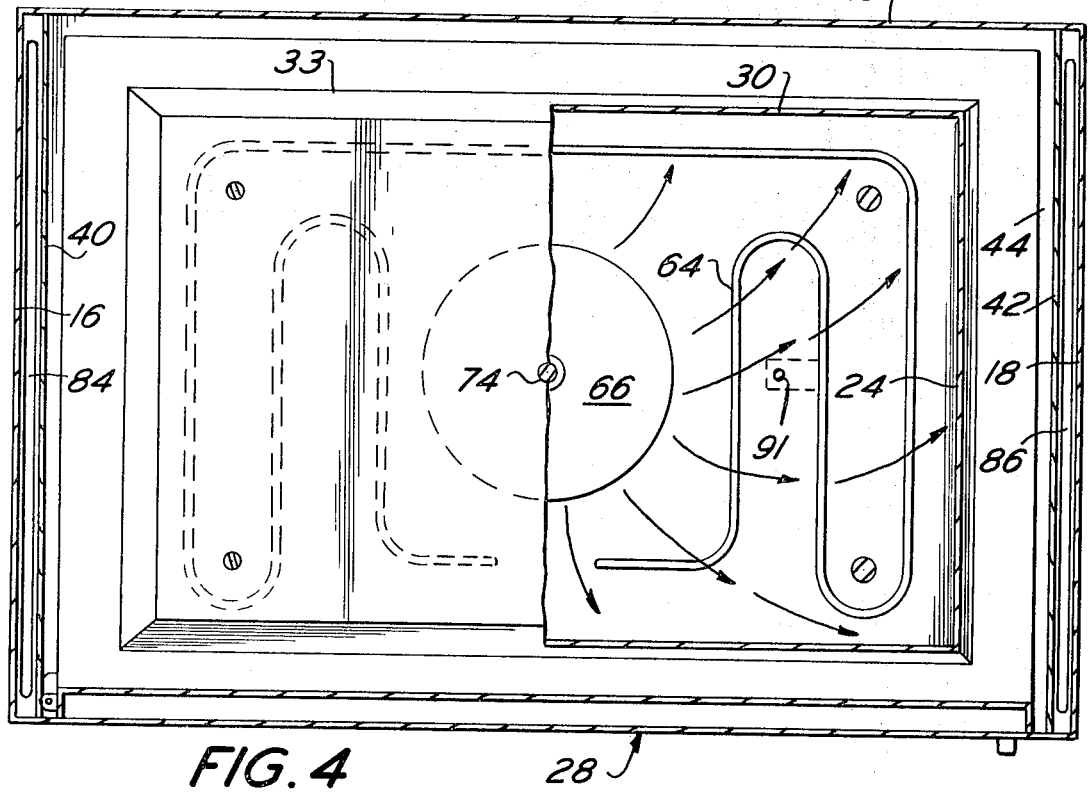
FIG. 4 is a sectional view taken along the line 4—4 in FIG. 2 but on a smaller scale.

Within the housing 12, there is provided a cooking chamber 22. The cooking chamber 22 is physically defined by the bottom wall 20, oppositely disposed side walls 24 and 26, an access door 28 mounted in the front wall 21, and a rear wall 30. Above the upper end of the cooking chamber 22 there is a heating chamber having a top wall 32. As shown more clearly in FIGS. 2 and 4, the top wall 32 has a wall portion 33 which is angled outwardly and downwardly for a purpose to be described hereinafter.

A horizontally disposed intermediate wall 34 is provided above wall 32. The chamber between walls 32 and 34 is an intermediate insulation chamber 36. A motor chamber 38 is provided between the intermediate wall 34 and the top wall 14.

A vertical wall 40 is between walls 16 and 24. A vertical wall 42 is between the walls 18 and 26. A flow passage 44 is defined by the spaced walls 26 and 42. A similar vertical flow passage 46 is defined by the spaced walls 24 and 40. The flow passages 44 and 46 are alongside the cooking chamber 22.

The upper end of flow passages 44 and 46 communicate with the intermediate insulation chamber 36. A lower end of flow passage 44 communicates with the atmosphere by way of openings such as slots 48 in wall 42. It will be noted, as shown more clearly in FIG. 2, that the lower edge of walls 40 and 42 is at a lower elevation than the lower edge of walls 16 and 18. The lower end of flow passage 46 communicates with the atmosphere by way of openings such as slots 50. The intermediate insulation chamber 36 communicates with the atmosphere by way of openings such as slots 52. See FIG. 3. Thus, air enters the slots 48 and 50 and rises up the flow passages 44, 46 by convection and exits from chamber 36 through the openings 52.

A pan 54 with a slotted cover 55 may be provided on the bottom wall 20 for supporting a wire tray or rack 56. The rack 56 may have V-shaped legs 58 which extend into slots on an outwardly extending flange of the pan 54. The legs 58 elevate the rack above the pan 54 so that air flow under the food may be achieved. The slots 57 in the cover 55 permit fats to drain into pan 54 entrapping the fats and spatter below cover 55. Equivalent devices may be utilized for supporting a food product 60 to be cooked within the cooking chamber 22. Rack 56 may be supported at various elevations in chamber 22 by the sets of protrusions 59 on the side walls 24, 26.

Figure 5:
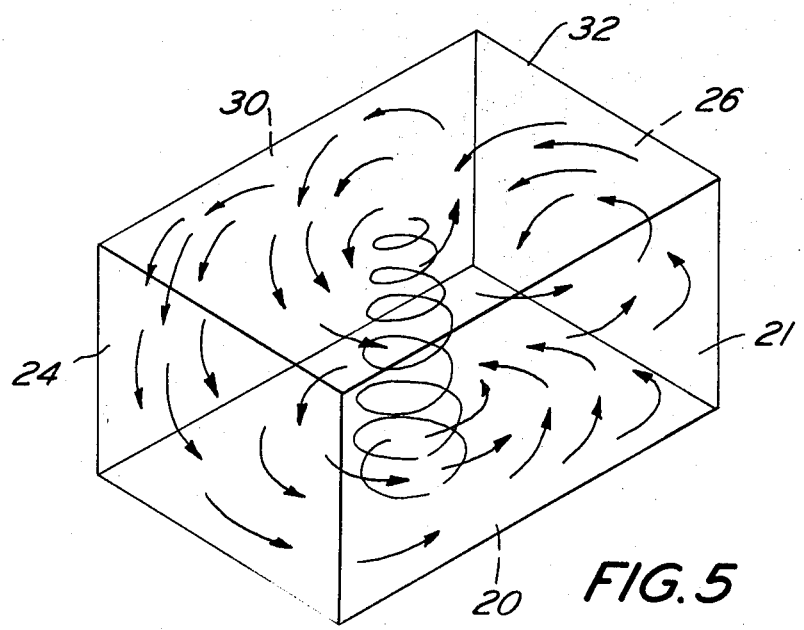
FIG. 5 is a schematic perspective view showing the cyclonic air pattern.

In FIG. 5, there is diagrammatically illustrated the cyclonic turbulent air pattern by means of the arrows. One set of arrows is provided for each of the vertical walls of the cooking chamber 22 for purposes of illustration only. Also, arrows which would be indicative of numerous eddy currents have not been illustrated since the arrows indicative of the same would be confusing. It will be noted that the air pattern has a central vertical vortex from the bottom of the cooking chamber 22 upwardly toward a filter 62. The foregoing flow patterns promote uniform heat throughout the cooking chamber, and avoid hot spots and dead spots. A high degree of conformity of temperature can be maintained around the food in the cooking area.

Figure 2:
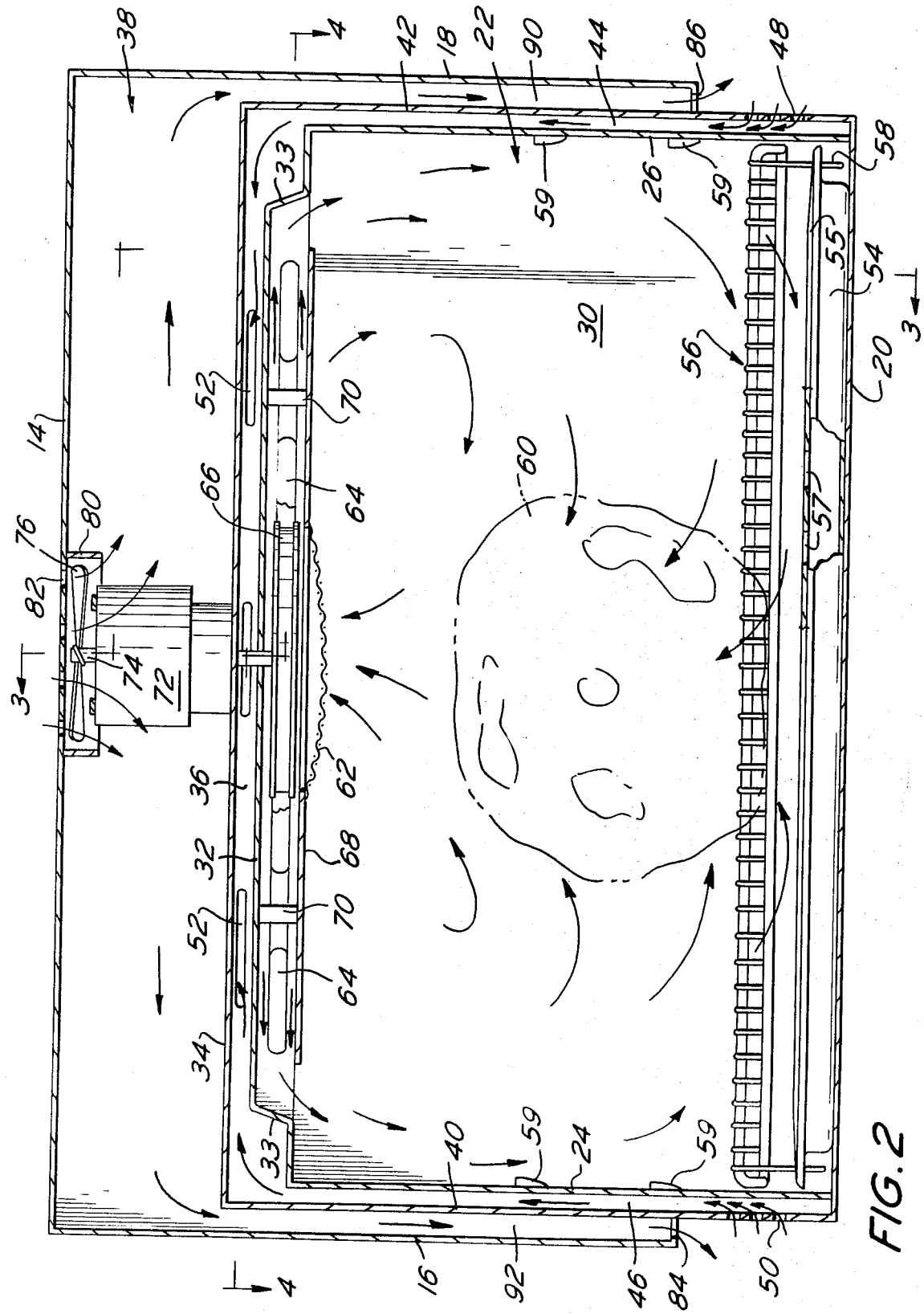
FIG. 2 is a sectional view taken along the line 2—2 in FIG. 1 but on an enlarged scale.
Figure 3:
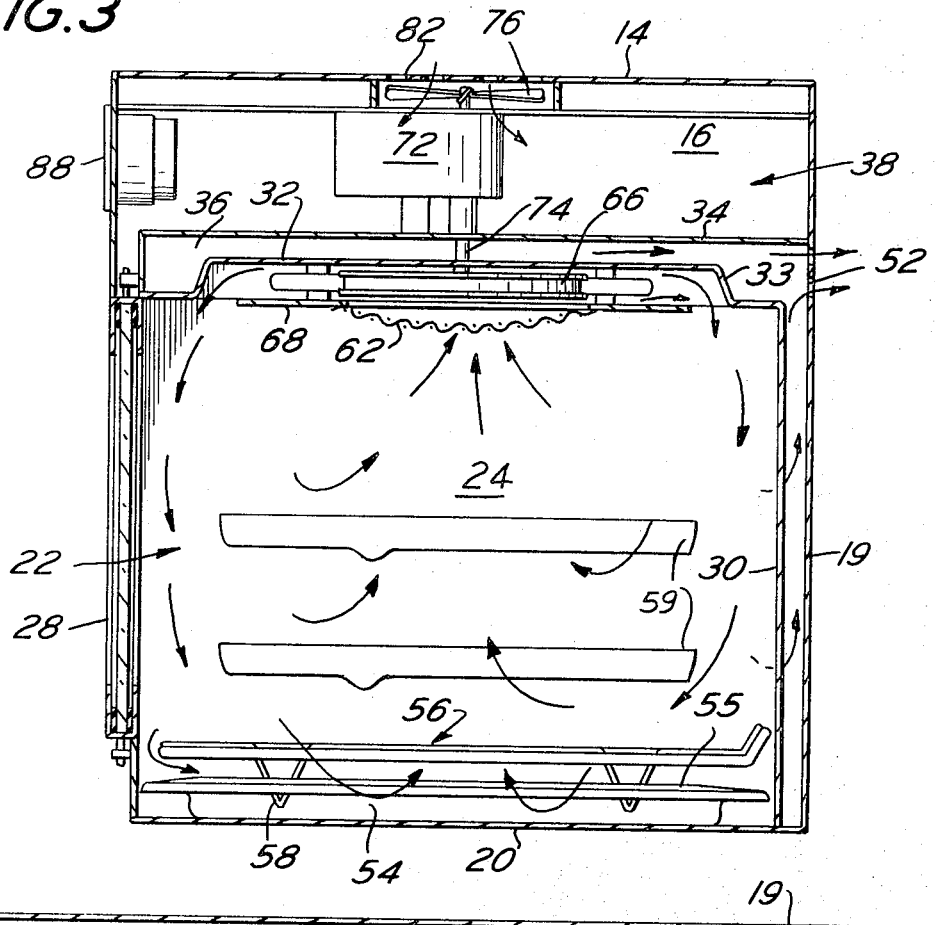
FIG. 3 is a sectional view taken along the line 3—3 in FIG. 2, but on a smaller scale.

As shown more clearly in FIG. 2, a removable washable filter 62 is supported by a perforated grid member 68. The filter 62 traps food soil, grease and the like so that they cannot move upwardly into the suction side of the vane type impeller 66. The impeller 66 directs the air centrifugally as an envelope across the heater means 64 in the heating chamber as indicated by the arrows in FIG. 4. The heater means 64 is a sealed heater means shaped for maximum surface presentation and may have a rating as low as 1,000 watts. Heat from the heater means 64 is radiated downwardly through the perforations in the grid member 68.

The perforated grid member 68 may be in the form of a screen of expanded metal held in depending relation from the wall 32 by means of supports 70. Supports 70 have a height corresponding generally to the height of the angled portion 33. The ratio of the area of the holes in the grid member 68 to the surface area is about 20–40 percent and preferably about 34 percent.

The grid member 68 is centrally located below and parallel to the plane of the heater means 64 and impeller 66. The grid member 68 serves several purposes. One of the purposes of grid member 68 is to serve as an air director which partially limits the air flow of the centrifugally discharged air from impeller 66 over the heater means 64. Another purpose is that it allows its open areas to accommodate the passage of radiation from the heater means 64 into the cooking chamber 22. This results in an assist to the controlled browning of foods. A third purpose of the grid member 68 is that through the existence of its open areas the air flow is not limited solely to lateral direction but rather the air flow is subjected to turbulence throughout the cooking chamber 22 by reason of the additional creation of air flow patterns down into the cooking chamber as well as air flow patterns up through the grid member 68. This multidirectional flow of air generates turbulence affording a desirable scattering dispersion of heat, thereby eliminating focally directed burn spots on delicate baking. The cyclonic effect of the turbulent air further aids in the diffusion of heated air throughout the cooking chamber 22. The grid member 68 also serves as a protective guard against any contact with the moving impeller 66 and constitutes a support for the filter 62. Further, grid member 68 defines the lower end of the heating chamber and the upper end of the cooling chamber 22.

A motor 72 is provided within the motor chamber 38 and supported by wall 34 of the housing 12. The motor 72 has a shaft 74. One end of the shaft 74 is connected to the impeller 66. Impeller 66 is preferably of the turbine type and discharges air centrifugally. The other end of the shaft 74 is connected to a fan 76 adjacent to openings or perforations 82 in the top wall 14. A duct 80 is connected to the motor 72 and surrounds the fan 76.

The fan 76 causes air to flow through the duct 80 for concentrated flow over motor 72 into the motor chamber 38 by way of the openings 82 to thereby cool the motor 72. This cooling air exits from the cooling chamber 38 by way of the ports 84 and 86. Port 86 communicates with the flow passage 90 between walls 18 and 42. Port 84 communicates with flow passage 92 between walls 24 and 40. All of the instruments (not shown) are located within motor chamber 38.

In use, access to the cooking chamber 22 is attained by pivoting the door 28 on its hinges. The food product 60 is disposed on the wire rack 56. The instrument controls 88 and 89, which actuate a thermostat control and timer, may be manipulated to set the temperature at a desired predetermined setting. The time period is controlled by timer 89. The thermostat control 88 is coupled to the temperature sensor 91 and controls the temperature settings by cycling the heater means 64. The motor 72, which operates continuously, is independent of the cycling of the heater means 64.

The angled wall portion 33 is spaced from walls 24, 26, 28 and 30 of the cooking chamber 22. The intersection of wall 33 and wall 32 lies in the plane of the wall 32 and defines a first plane. The lower end of wall 33 is a point in another plane, below and parallel to wall 82, and defines a second plane. The impeller 66 and heater means 64 lie between said first and second planes of the wall portion 33. The grid member 68 is immediately adjacent the second plane and has its periphery spaced from the outer periphery of wall portion 33 to avoid any restrictions on air flow. Thus, the distance between the periphery of grid member 68 and the outer periphery of wall portion 33 is approximately the same as the distance between said first and second planes. In order for the heated air to be deflected by wall portion 33 and achieve the turbulent flow pattern referred to heretofore, wall portion 33 preferably lies in a plane disposed at an acute angle to be described hereinafter.

Ambient air enters through the slots 48 and 50 and flows upwardly in flow passages 44, 46 to the intermediate chamber 36 due to convection. Air from chamber 36 exists through the slots 52. At the same time, the fan 76 causes cooling air to enter through the openings 82 and discharge through the ports 84 and 86. The intermediate insulation chamber 36 isolates the motor 72 from the heat generated in the cooking chamber 22. The cooling air passing through chamber 38 cools the motor 72 before traveling downwardly through the auxiliary flow passages 90 and 92.

The walls of cooking chamber 22 may be kept continuously clean with a catalytic coating. The cleaning process is accentuated by the presence of circulating air. Due to the fact that air passes through filter 62 which removes substantially all food soil and grease, the heater means 64 remains clean. The food product 60 will be subjected to heated air and radiant heat. The thermostat control 88 permits close regulation of the temperature within the cooking chamber 22.

This invention, utilizing heated air at a controlled rate of turbulence and velocity, results in substantial time savings in the preparation of food. The time for cooking frozen foods has been reduced by as much as 50 percent. This is accomplished without any time spent in thawing and with distinct improvement in appearance, texture, quality and flavor. Meat retains its natural juices and is not dried out. Meat, poultry and baked goods are prepared to a rich coloring. Cooking can be accomplished at less than normal temperatures, thereby retaining natural juices. Because of the shortened cooking time and the lower temperatures required, there is a saving of electrical energy.

Figure 6:
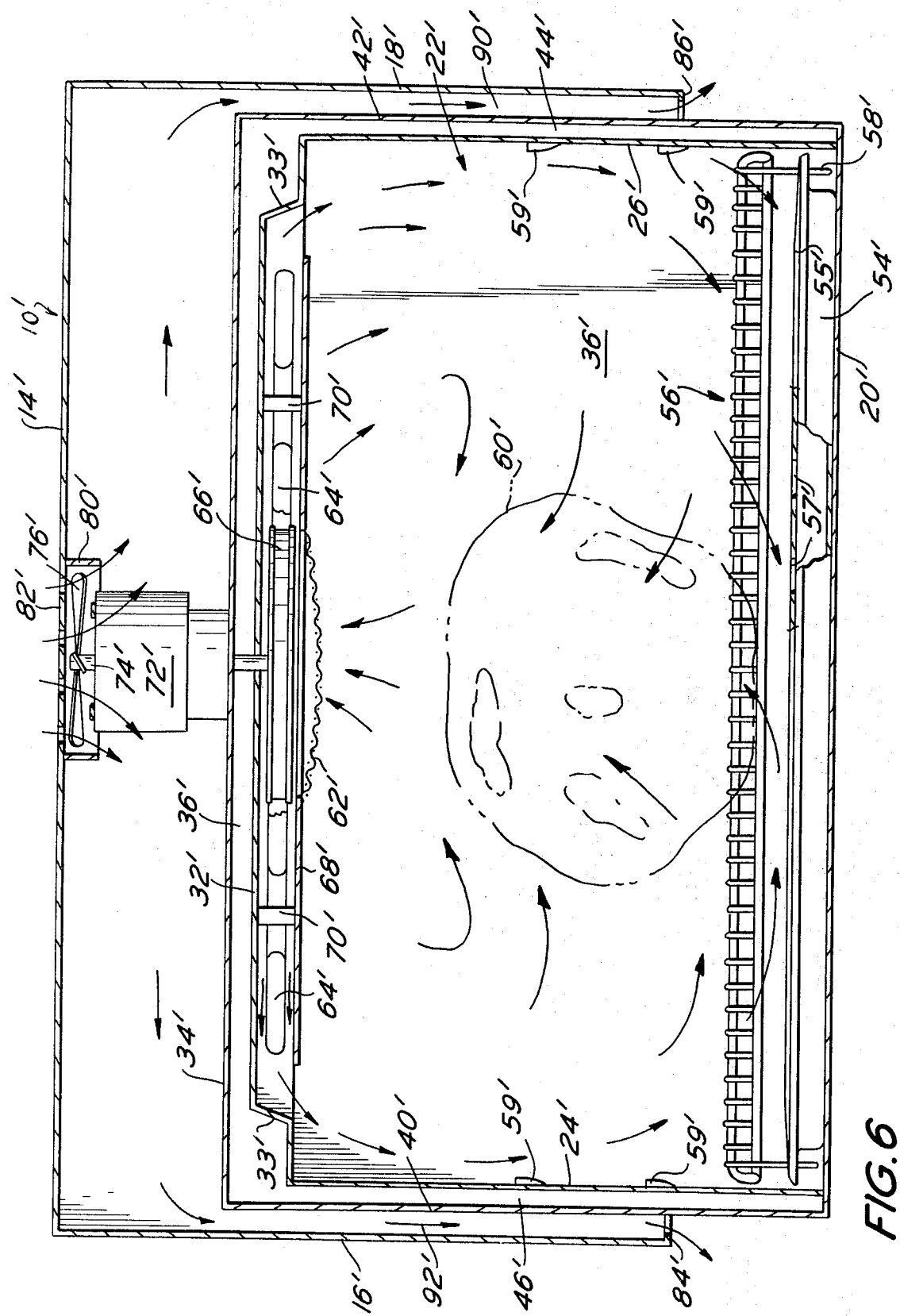
FIG. 6 is a view similar to FIG. 2 but showing another embodiment.

In FIG. 6 there is illustrated another embodiment of the oven designated 10'. Oven 10' is identical with oven 10 except as made clear hereinafter. Hence, corresponding elements are designated with corresponding primed numerals.

In the oven 10', the spaces 44' and 46' communicate with, and form part of, the intermediate insulation chamber 36'. Chamber 36' is a closed chamber with no inlet or exit ports nor any air flow therein. Oven 10' is otherwise identical with oven 10.

Air velocity readings in the plane of the impeller 66 show that when the heated air reaches wall portion 33, it meets back pressure resistance as shown by a drop in velocity from 700 feet per minute to 300 feet per minute in the same plane. At this point the pre-heated air is broken up into random dispersement of velocities which show no prominent single direction. Test readings show variable velocity directions at various measured points that confirm there is no set pattern, and that turbulence has indeed taken place.

Experimentally it has been shown that if the angle of wall portion 33 were much greater than 45° with respect to a vertical, it would deflect the major portion of the heated air against the upright walls of cooking chamber 22. This would result in the concept of wall washing or a curtain, which in effect is what we are trying to avoid. On the other hand, if the angle of wall portion 33 were much less than 10° with respect to a vertical, it would then present a very high back pressure of the heated air, resulting in poor air flow transfer into the cooking chamber 22. A useful working range for the angle of wall 33 would be from 10° to 45° from the vertical, wherein 20° with respect to a vertical appears to be optimum.

Another important feature is the vertical height of the inclined wall portion 33, which has been established as an optimum of ¾ inch. If the height were greater than 1¼ inches, the total envelope of air mass around the heater means 64 would be too great to permit rapid pre-heating of the air in passing over the heater means 64. On the other hand, if the height were much less than ½ inch, the total air mass envelope over the heater means would be much thinner and would require a more powerful impeller and greater rpms to overcome compressive effects of pushing air through the thinner section. In addition, the height of wall portion 33 must be such that the total air envelope strikes wall portion 33. In other words, if wall portion 33 is too short in vertical height, some of the air in the lower part of the envelope would bypass wall portion 33 and consequently defeat the intended effect of the turbulence created by wall portion 33. While the optimum vertical height of wall 33 is ¾ inch in one embodiment, the vertical height of wall portion 33 could range from ½ inch to 1¼ inches so long as the above parameters are adhered to.

For the reasons set forth above, the heat is distributed uniformly throughout the cooking chamber 22. As a result thereof, hot spots which cause carbonizing of cooking fats and resultant smoke can be eliminated. Thus, thermostat control 88 can be set so that the temperature in the cooking chamber 22 is below the carbonization temperature of fat. The ability to substantially minimize smoke and spattering is an advantage attained by the oven of the present invention.

The present invention may be embodied in other specific forms without departing from the spirit or essential attributes thereof and, accordingly, reference should be made to the appended claims, rather than to the foregoing specification as indicating the scope of the invention.

We claim:

1. An oven for cooking and/or defrosting food comprising a housing having a cooking chamber which is closed except for an access door, means in the chamber for supporting food to be heated, heater means supported adjacent said cooking chamber, air circulation means supported by said housing and including an impeller having centrifugal discharge for moving air circumferentially over the heating means and then toward a remote wall of said cooking chamber in a cyclic turbulent pattern to a vortex from which the air is drawn to the suction side of said impeller, said air circulation means including an angled wall portion spaced from the adjacent walls of said chamber, said angled wall portion converging in a direction away from said wall, said angled wall portion surrounding said heater means and the impeller periphery, the inner and outer periphery of said angled wall portion defining spaced planes, said impeller and heater means being located between said planes, a perforated grid member adjacent the plane defined by the outer periphery of said angled wall portion, the distance between the outer periphery of grid member and the outer periphery of the angled wall portion being approximately the same as the distance between said planes, and a motor supported by said housing, said motor being connected to said impeller for rotating the impeller to circulate the air in said cyclonic turbulent pattern.

2. An oven in accordance with claim 1 including a filter removably supported in said cooking chamber adjacent the impeller suction side for trapping foreign substances from the air before the air is recirculated by the impeller and reheated by said heater means.

3. An oven in accordance with claim 1 including an empty intermediate insulation chamber above and alongside the cooking chamber, said intermediate insulation chamber being independent from and free from communication with said cooking chamber.

4. An oven in accordance with claim 3 including means for providing communication between said intermediate insulation chamber and the environment outside of said housing.

5. An oven in accordance with claim 3 wherein said intermediate insulation chamber is a sealed chamber.

6. An oven in accordance with claim 3 including a motor chamber, said intermediate insulation chamber being between said cooking chamber and said motor chamber, said motor being disposed within the motor chamber and connected to said impeller by a shaft extending through said intermediate insulation chamber.

7. An oven in accordance with claim 6 wherein said motor chamber has entrance and exit ports, a fan for causing air to flow from the entrance port through the motor chamber to the exit port and cool the motor, said fan being connected to and driven by said motor, the portions of said motor chamber containing the exits therefrom being disposed alongside portions of the intermediate insulation chamber, and said portions of the intermediate insulation chamber being between said portions of the motor chamber and the walls of the cooking chamber.

8. An oven in accordance with claim 1 wherein said grid member is generally parallel to said planes and has holes herein which extend through the grid which constitute 20–40 percent of the surface of said grid member for continuous exposure of food to radiant heat from the heater means.

9. An oven in accordance with claim 1 including a pan having a perforated cover within said cooking chamber, a rack having air flow passages therein supported by said pan, said rack constituting the means for supporting food to be heated.

10. An oven in accordance with claim 1 wherein said angled wall portion is integral with a top wall, said motor being supported within a motor chamber above said top wall, said grid member being supported in spaced relation to and by said top wall to define therebetween a heating chamber, and said angled wall portion being at an angle with respect to the vertical of between about 10° and 45°.

11. An oven in accordance with claim 10 wherein said angle is about 20° with respect to the vertical.

12. An oven for cooking and/or defrosting food comprising a housing having walls defining a cooking chamber which is closed except for an access door, means in the chamber for supporting food to be heated, a pan having a perforated cover in said chamber below said food supporting means, heater means supported in a heating chamber, air circulation means in said heating chamber including an impeller having centrifugal discharge for moving air circumferentially over the heater means and then towards said food supporting means in a cyclonic turbulent pattern to a vortex from which the air is drawn to the suction side of said impeller, a flat perforated grid member between the impeller and said food supporting means, said grid member having holes constituting between 20 and 40 percent of the surface of the grid member, said heater means being between said grid member and the top wall of said heating chamber and adjacent to the outer periphery of said impeller, a motor supported by said housing above said top wall of said heating chamber, an intermediate insulation chamber between said motor and the top wall of said heating chamber, said motor being connected to said impeller by a shaft extending through said insulation chamber, said intermediate insulation chamber being independent from and free of any communication with said cooking chamber, and said heater means being electrical heater means.

13. An oven in accordance with claim 12 including a filter in said cooking chamber adjacent the impeller suction side for trapping foreign substances from the air before the air is recirculated by said impeller and reheated by said heater means, said filter being removably supported by said grid member.

14. An oven in accordance with claim 12 wherein said air circulation means includes a wall portion surrounding the impeller and inclined radially outwardly and downwardly at an angle of about 20° with the vertical.

15. An oven for cooking and/or defrosting food comprising a housing having a closed cooking chamber, a door on said housing, said door constituting the only exit from the cooking chamber, a heating chamber in said housing and communicating with said cooking chamber, means in the cooking chamber for supporting food to be heated, electrical heater means supported in said heating chamber for radiantly heating food in the cooking chamber, air circulation means for moving air circumferentially over said heater means and then toward said food supporting means in a cyclonic turbulent pattern having a random distribution of velocities which have no single prominent direction to a vortex in the central part of the cooking chamber from which air is drawn upwardly in a cyclonic pattern away from the food supporting means for recycling over said heater means, said air circulation means being constructed and arranged to move the air over the heater means at a velocity greater than the velocity of the air in each of said cyclonic patterns, and said cooking chamber being free from any baffles which interfere with said cyclonic patterns.

16. An oven in accordance with claim 15 wherein said air circulation means includes an angled wall portion spaced from the adjacent walls of said cooking chamber, a motor driven impeller, said angled wall portion converging upwardly in a direction away from the food supporting means, said angled wall portion surrounding said heater means and the impeller periphery, the inner and outer periphery of said angled wall portion defining spaced planes, said impeller and heater means being located in the heating chamber between said planes, a perforated grid member adjacent the plane defined by the outer periphery of said angled wall portion, the distance between the outer periphery of the grid member and the outer periphery of the angled wall portion being approximately the same as the distance between said planes.

17. An oven in accordance with claim 16 wherein said angled wall portion is at an acute angle of about 15–25° with respect to the vertical.

18. An oven in accordance with claim 16 wherein said distance between the planes is about ½ to 1¼ inches.

19. An oven in accordance with claim 18 wherein said distance is about ¾ inches.

20. An oven in accordance with claim 15 including a filter removably supported in said cooking chamber for trapping foreign substances from the air in said vortex before the air is recirculated and reheated by said heater means.

* * * * *